United States Patent
Persson (10) Patent No.: US 10,150,201 B2
(45) Date of Patent: Dec. 11, 2018

(54) GRINDING MACHINE CASING FOR A GRINDING MACHINE

(71) Applicant: Tormek AB, Lindesberg (SE)

(72) Inventor: Håkan Persson, Lindesberg (SE)

(73) Assignee: Tormek AB, Lindesberg (SE)

( * ) Notice: Subject to any disclaimer, the term of this patent is extended or adjusted under 35 U.S.C. 154(b) by 0 days.

(21) Appl. No.: 14/627,383

(22) Filed: Feb. 20, 2015

(65) Prior Publication Data
US 2015/0336235 A1 Nov. 26, 2015

(30) Foreign Application Priority Data
May 22, 2014 (SE) ........................ 1450614

(51) Int. Cl.
| | |
|---|---|
| *F16B 7/14* | (2006.01) |
| *B24B 41/06* | (2012.01) |
| *B24B 27/02* | (2006.01) |
| *B24B 3/00* | (2006.01) |
| *B24B 41/02* | (2006.01) |

(52) U.S. Cl.
CPC ............ *B24B 41/02* (2013.01); *B24B 3/00* (2013.01); *B24B 27/02* (2013.01); *B24B 41/06* (2013.01); *B24B 41/066* (2013.01); *F16B 7/14* (2013.01); *F16B 7/1472* (2013.01)

(58) Field of Classification Search
CPC .......... B24B 3/00; B24B 27/02; B24B 41/02; B24B 41/06; B24B 41/066; F16B 7/14; F16B 7/1472
USPC ................ 451/241, 360, 361, 367, 370, 372
See application file for complete search history.

(56) References Cited

U.S. PATENT DOCUMENTS

| | | | | |
|---|---|---|---|---|
| 2,306,959 | A * | 12/1942 | Knibbe .................. | F16F 15/145 |
| | | | | 416/145 |
| 3,142,945 | A * | 8/1964 | Happe ..................... | B24B 27/02 |
| | | | | 451/361 |
| 3,534,847 | A * | 10/1970 | Willcox ................... | B41J 21/00 |
| | | | | 178/34 |

(Continued)

FOREIGN PATENT DOCUMENTS

| | | |
|---|---|---|
| GB | 2 396 837 A | 7/2004 |
| WO | WO 97/34736 A1 | 9/1997 |

(Continued)

OTHER PUBLICATIONS

Extended European Search Report for corresponding European Patent Application No. 15155959.8 dated Oct. 16, 2015.

(Continued)

*Primary Examiner* — Eileen Morgan
(74) *Attorney, Agent, or Firm* — Merchant & Gould P.C.

(57) ABSTRACT

The present invention relates to the field of grinding machines. In one of its embodiments, this disclosure presents a grinding machine casing (30) for a grinding machine (100). The grinding machine casing (30) comprises a first casing part (10), which is mounted to a second casing part (20). The first casing part (10) is provided with a set of brackets. Each bracket of a set of brackets comprises a hole which is adapted to receive a cylindrical end of a support bar (60) such that the support bar (60) can be releasably connected to the first casing part (10). Still further, one bracket in each set of brackets comprises a hole, the cross-section of which is non-circular.

9 Claims, 8 Drawing Sheets

(56) References Cited

U.S. PATENT DOCUMENTS

| | | | | |
|---|---|---|---|---|
| 3,804,541 | A * | 4/1974 | Pitner | F16B 2/065 403/204 |
| 4,435,103 | A * | 3/1984 | Becker | A47B 13/02 248/188 |
| 5,218,787 | A * | 6/1993 | Rice | B24B 3/365 451/224 |
| 5,816,735 | A * | 10/1998 | Jansson | F16B 7/1472 403/16 |
| 5,850,760 | A * | 12/1998 | Jin | F16H 61/30 74/388 R |
| D447,155 | S * | 8/2001 | Lin Ku | D15/124 |
| 6,623,340 | B2 * | 9/2003 | Jansson | B24B 3/38 451/185 |
| D490,522 | S * | 5/2004 | Jansson | D15/124 |
| D505,683 | S * | 5/2005 | Pfaff | D15/124 |
| 7,524,236 | B2 * | 4/2009 | Schwaiger | B24B 3/00 451/276 |
| 7,686,678 | B2 * | 3/2010 | Jansson | B24B 41/066 451/367 |
| 8,556,685 | B2 * | 10/2013 | Jansson | B24B 3/38 451/367 |
| 2003/0001015 | A1 * | 1/2003 | Rouverol | G07C 13/00 235/458 |
| 2005/0287934 | A1 * | 12/2005 | Jansson | B24B 3/586 451/45 |
| 2007/0218818 | A1 * | 9/2007 | Schwaiger | B24B 3/00 451/359 |
| 2007/0218819 | A1 * | 9/2007 | Schwaiger | B24B 3/00 451/371 |
| 2009/0318066 | A1 | 12/2009 | Clay | |

FOREIGN PATENT DOCUMENTS

| | | |
|---|---|---|
| WO | WO 2007/098470 A2 | 8/2007 |
| WO | WO 2010/102415 A1 | 9/2010 |

OTHER PUBLICATIONS

European Office Action for corresponding European Patent Application No. 15155959.8 dated Apr. 25, 2016.

\* cited by examiner

Figure 1 (Existing art)

GRINDING MACHINE CASING FOR A GRINDING MACHINE

This application claims benefit of Serial No. 1450614-1, filed 22 May 2014 in Sweden and which application is incorporated herein by reference. To the extent appropriate, a claim of priority is made to the above disclosed application.

TECHNICAL FIELD

The present disclosure generally relates to the field of grinding machines. More particularly, the present disclosure presents a first casing part mountable to a second casing part for forming a grinding machine casing of a grinding machine. The disclosure also presents various embodiments of a grinding machine casing for a grinding machine. Furthermore, various embodiments of a grinding machine are presented.

BACKGROUND

Edge tools, for example for woodworking (e.g. woodturning tools), generally have to be sharp in order to obtain desired results. Sharpening may be performed by means of a rotating grindstone in a grinding machine.

Figure 1:
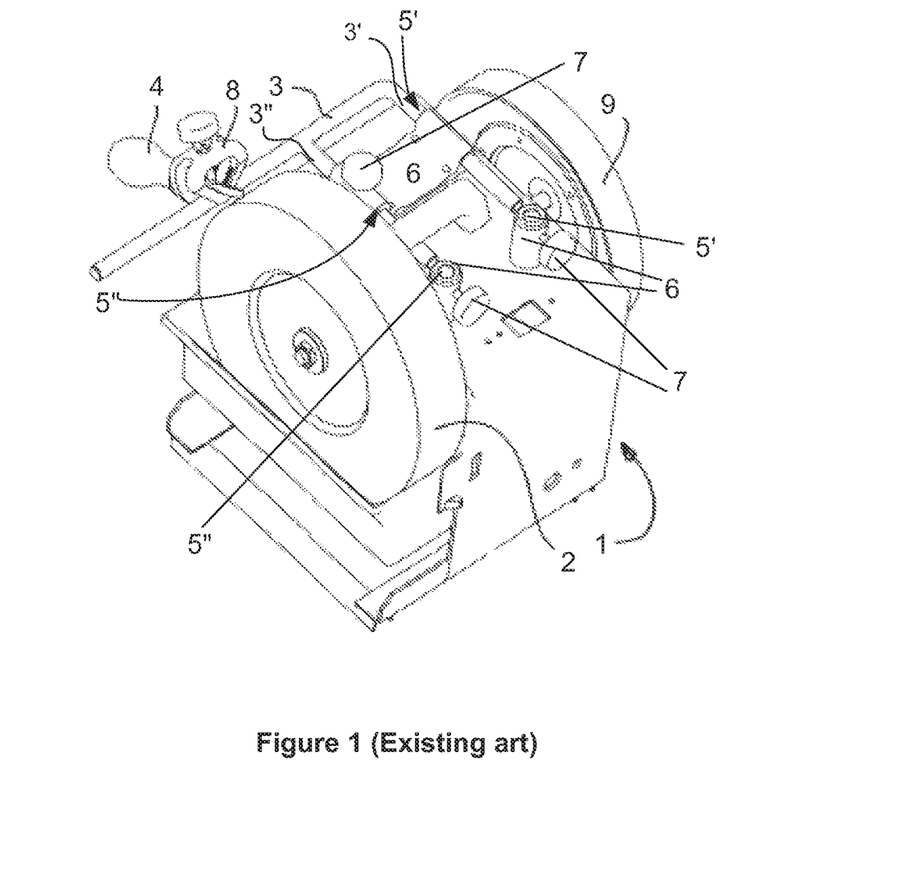
FIG. 1 is a perspective view of an exemplary grinding machine according to existing art.

An example of a conventional grinding machine 1 is shown in FIG. 1. The grinding machine 1 is provided with an essentially circular grindstone 2. The grindstone 2 is driven by a motor, e.g. an electrical motor (not shown), which is typically placed inside the grinding machine 1.

The grinding machine 1 is also provided with support means 3 in the vicinity of the grindstone 2. A purpose of the support means 3 is, as indicated in FIG. 1, to serve as a guiding means for an edge tool 4 to be sharpened by the grindstone 2.

In the exemplary grinding machine 1 shown in FIG. 1, the support means 3 is a cylindrical support bar, which is sometimes referred to as a universal bar. The cylindrical support bar 3 is essentially parallel with the rotation axis of the grindstone 2. Two cylindrical ends (or legs) 3', 3" of the cylindrical support bar 3 are to be inserted in respective holes 5', 5" of brackets 6 that are placed on top of the grinding machine 1. Typically, the cross-section of each hole 5', 5" is circular in order to achieve a desired radial play between the respective cylindrical ends 3', 3" and the respective holes 5', 5" when the cylindrical ends 3', 3" are inserted into the respective holes 5', 5". Furthermore, the position of the cylindrical support bar 3, and thus the distance between the cylindrical support bar 3 and the grindstone 2, may be adjusted to suit different needs or purposes for grinding different edge tools 4 by the grindstone 2. Said position of the cylindrical support bar 3 may e.g. be fixed by a set screw 7.

Typically, but not necessarily, a grinding jig 5 may be used in order to assist the user of the grinding machine 1 to hold the edge tool 4 correctly in relation to the grindstone 2 and on the cylindrical support bar 3. In order to set the position of the cylindrical support bar 3 for obtaining a desired edge angle of the tool 4 supported for grinding by the support bar 3, a tool setter as described in EP 1 818 138 B1 may also be advantageously used.

Furthermore, the grinding machine 1 may optionally comprise a wheel 9 for honing, as illustrated in FIG. 1.

SUMMARY

Although conventional grinding machines, such as the grinding machine 1 shown in FIG. 1, provide many advantages there is still a need for further improvements. For example, the inventor has realized that there is a need for allowing a user of a grinding machine to be able to more easily position a cylindrical support bar in relation to the grinding machine. For example, and with reference to FIG. 1, when the two ends of the cylindrical support bar are to be inserted in the respective holes of the brackets that are placed on top of the grinding machine, there is a potential problem of the so-called drawer effect. Generally, what is meant by the expression "drawer effect" is a dysfunction in the mechanical system, where a mechanical component (in this example, a leg of the support bar) which is arranged to slide in a space (in this example, a hole) ends up in an oblique position, in which oblique position the sliding of the mechanical component is rendered more difficult. Traditionally, the problem of the drawer effect has been solved by increasing the radial play between the ends of the cylindrical support bar and the holes. Generally, this will however negatively affect the stability of the support bar during the operation of the grinding machine.

The inventor has further realized that it would be advantageous to simultaneously allow for improved stability of the support bar during the operation of the grinding machine.

It is in view of the above considerations and others that the various embodiments of the present invention have been made. It is a general object of the embodiments of the invention to allow a user of the grinding machine to be able to more easily position a support bar to a grinding machine. This general object has therefore been addressed by the appended independent claim 1. Advantageous embodiments are defined in the appended dependent claims.

According to a first aspect, the general object is addressed by a first casing part, which is mountable to a second casing part for forming a grinding machine casing of a grinding machine. The first casing part comprises at least one set, i.e. one or more sets, of brackets. Each bracket of the one or more brackets comprises a hole which is adapted to receive a cylindrical end of a support bar such that the support bar can be releasably connected to the first casing part. At least one bracket in each set of brackets comprises a hole, a cross-section of which is non-circular. Preferably, but not necessarily, only one bracket in each set of brackets comprises a hole, the cross-section of which is non-circular.

In a preferred embodiment, said cross-section is oval. Thus, the cross-section may for instance be in the shape of an ellipse, a stadium, or any other egg-like shape.

In a preferred embodiment, the first casing part is provided with two sets of brackets. One bracket in each set of brackets comprises the hole, the cross-section of which is non-circular, e.g. oval.

By providing at least one bracket in each set of brackets with a hole, the cross-section of which is non-circular, it is made possible to reduce, alleviate or even eliminate any drawer effect that would otherwise occur when two (or more) parallel cylindrical ends of a cylindrical support bar are to be inserted in respective holes without compromising with the stability of the support bar. The hole, the cross-section of which is non-circular, may serve as a guiding means for the user when inserting the cylindrical ends of a cylindrical support bar in their respective holes. Accordingly, a user of a grinding machine may be able to more easily position a cylindrical support bar in relation to the grinding machine.

Also, since the hole, the cross-section of which is non-circular, reduces, alleviates or even eliminates any drawer effect the inventor has realized that it is possible to adjust the tolerance level of the other hole(s) such that a reduced radial play between the cylindrical end of the support bar and the hole can be accepted for such hole(s). In other words, those holes having a cross-section which is circular may have a circumference which is close, or very close, to the corresponding circumference of the circular end of the support bar. This, in turn, means that a better precision can be achieved between a cylindrical end of the support bar and a hole having a cross-section which is circular. Hereby it is made possible to allow for increased stability of the support bar during operation of a grinding machine.

In conclusion, by having a combination of at least two holes wherein the cross-section of at least one (preferably only one) of the holes is non-circular (e.g. oval) it is made possible to "kill two birds with one stone", namely 1) to allow a user of a grinding machine to be able to more easily position a cylindrical support bar in relation to the grinding machine and 2), to contribute to an increased stability of the support bar during the operation of the grinding machine due to the fact that it is possible to reduce the radial play between a cylindrical end of the support bar and a hole, the cross-section of which is circular.

In a preferred embodiment, the first casing part is moulded. For example, the first casing part may be made of moulded metal, such as Zinc. The provision of a moulded casing part contributes to an increased stability of the grinding machine when the grinding machine is in operation.

Alternatively, the metal may be aluminum. In yet alternative embodiments, the first casing part could e.g. be made of steel, brass, cast iron.

Preferably, but not necessarily, the first casing part further comprises a hole adapted to receive a pivotal axis of a rotatable grindstone. Additionally, or alternatively, a motor (e.g., an electrical motor) for driving the grinding machine is advantageously releasably mounted to the first casing part. Thus, it is made possible to mount the motor and/or the grindstone to the moulded first casing part. In operation of a grinding machine, the motor and/or the grindstone may thus be mounted the moulded first casing part. Since the motor and/or the grindstone may be mounted to the moulded first casing part, the moulded first casing part may e.g. absorb vibrations caused by the operation of the motor and/or the rotation of the grindstone. In turn, the absorbing of these vibrations may contribute to an increased stability of the grinding machine during the operation of the grinding machine. Improved stability of the grinding machine may, in turn, improve the likelihood for the user to achieve a desired precision when sharpening edge tools on the grindstone of the grinding machine.

According to a second aspect, the earlier-mentioned general object is addressed by a grinding machine casing for a grinding machine. The grinding machine casing comprises a first casing part mounted to a second casing part, wherein the first casing part is a first casing part according to the above-mentioned first aspect. The second casing part may be moulded. For example, the second casing part may be made of moulded metal, e.g. Zinc. Alternatively, the second casing part may e.g. be made of plastic. It should be understood that the grinding machine casing of the second aspect may be provided in one single part, or piece. In other words, it is not necessary that two casing parts are mounted to each other. Accordingly, a grinding machine casing for a grinding machine may comprise at least one set of brackets, wherein each bracket of the at least one set of brackets comprises a hole which is adapted to receive a cylindrical end of a support bar such that the support bar can be releasably connected to the grinding machine casing, and wherein at least one bracket in each set of brackets comprises a hole, a cross-section of which is non-circular. If provided in one single part, the grinding machine casing may preferably, but not necessarily, be moulded. For example, the grinding machine casing may be made of moulded metal, such as Zinc.

According to a third aspect, the earlier-mentioned general object is addressed by a grinding machine, which comprises the grinding machine casing according to the second aspect.

BRIEF DESCRIPTION OF THE DRAWINGS

These and other aspects, features and advantages will be apparent and elucidated from the following description of various embodiments, reference being made to the accompanying drawings, in which.

DETAILED DESCRIPTION OF EMBODIMENTS

The present invention will now be described more fully hereinafter. The invention may, however, be embodied in many different forms and should not be construed as limited to the embodiments set forth herein; rather, these embodiments are provided by way of example so that this disclosure will be thorough and complete, and will fully convey the scope of the invention to those persons skilled in the art. Like reference numbers refer to like elements throughout the description.

Figure 2:
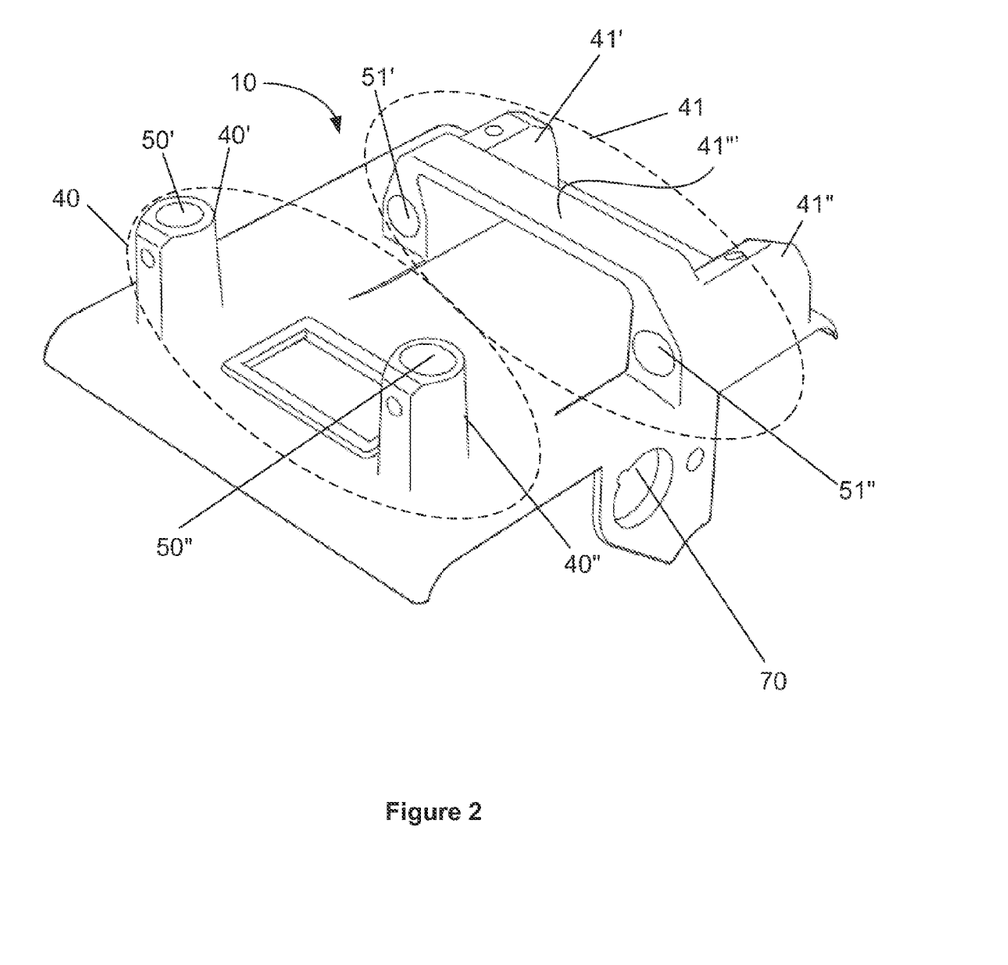
FIG. 2 is a perspective view of a first casing part according to an embodiment of the invention.

FIG. 2 illustrates a first casing part 10 according to an embodiment of the invention. The first casing part 10 is mountable to a second casing part 20, which can e.g. be seen in FIGS. 3, and 5, respectively. When mounted to the second casing part 20, the first and second casing parts 10, 20 form a grinding machine casing 30. A grinding machine 100, as is illustrated in FIGS. 4 and 6, respectively, may comprise the grinding machine casing 30.

In the exemplary embodiment shown in FIG. 2, the first casing part 10 comprises two sets of brackets 40, 41.

Each bracket 40', 40" of a first set of brackets 40 comprises a respective hole 50', 50". That is, a first bracket 40' comprises a first hole 50' and a second bracket 40" comprises a second hole 50". The first and second holes 50', 50" are adapted to receive a respective cylindrical end of a support bar 60 such that the support bar 60 can be releasably connected to the first casing part 10, as is e.g. illustrated in FIGS. 3 and 4.

Similarly, each bracket 41', 41" of a second set of brackets 41 comprises a hole 51', 51". That is, a third bracket 41' comprises a third hole 51' and a fourth bracket 41" comprises a second hole 51". The third and fourth holes 50', 50" are also adapted to receive a cylindrical end of the support bar 60 such that the support bar 60 can be releasably connected to the first casing part 10, as is illustrated in FIGS. 5 and 6. In the exemplary embodiment shown in FIG. 2, an optional handle 41''' is provided between the third and fourth brackets 41', 41". Or said differently, the optional handle 41''' connects the third bracket 41' with the fourth bracket 41". The optional handle 41''' has the advantage that it allows a user of the grinding machine 100 to more easily lift, and thus move, the grinding machine 100.

At least one bracket in each set of brackets 40, 41 comprises a hole, the cross-section of which is non-circular. In the preferred embodiments illustrated in FIGS. 2-7, one bracket in each set of brackets 40, 41 comprises a hole, the cross-section of which is non-circular, e.g. oval. The cross-sections of the respective brackets are best shown in FIGS. 2 and 7, respectively. Bracket 40" of the first set of brackets 40 is provided with the hole 50", the cross-section of which is oval. The other bracket 40' of the first set of brackets 40 comprises a hole, the cross-section of which is circular. Similarly, bracket 41" of the second set of brackets 41 is provided with the hole 51", the cross-section of which is oval. The other bracket 41' of the second set of brackets 41 comprises a hole, the cross-section of which is circular. By providing one bracket 40", 41" in each set of brackets 40, 41 with a hole 50", 51", the cross-section of which is oval, it is possible to reduce, alleviate or even eliminate any drawer effect that would otherwise occur when two parallel cylindrical ends of the cylindrical support bar 60 are to be inserted into their respective holes (see e.g. FIGS. 3-6). This may be done without compromising the stability of the support bar 60. The hole, the cross-section of which is oval, may serve as a guiding means for the user when inserting the cylindrical ends of the cylindrical support bar 60 into their respective holes. Accordingly, a user of a grinding machine may be able to more easily position the cylindrical support bar 60 in relation to the grinding machine 100 (see FIGS. 4 and 6).

Furthermore, since the hole, the cross-section of which is oval, reduces, alleviates or even eliminates any drawer effect it is possible to reduce the radial play between cylindrical ends of the support bar 60 and the holes the cross-section of which are circular and thereby achieve an improved stability of the cylindrical support bar 60 when the cylindrical support bar 60 is mounted to the first casing part 10. Advantageously, the cylindrical support bar 60 may then also be fixed in a desired position, e.g. by means of set screws 80 as is best shown in FIGS. 3-6. In fact, the radial play can be adjusted such that the circumference of the hole the cross-section of which is circular comes close, or very close, to the corresponding circumference of the circular end of the support bar 60 that is to be inserted into this hole. This is generally not possible in the existing art, because when both holes of a set of brackets are circular, the drawer effect becomes too evident to the user if the two holes are provided with circumferences that come too close to the corresponding circumferences of the circular ends of the cylindrical support bar 60 that are to be inserted into the holes. By the combination of one hole the cross-section of which is circular and one hole the cross-section which is non-circular, e.g. oval, as is illustrated in this embodiment it is thus possible to allow a user of a grinding machine to be able to more easily position a cylindrical support bar in relation to the grinding machine and, at the same time, contribute to an increased stability of the support bar during the operation of the grinding machine due to the fact that it is possible to reduce the radial play between the cylindrical end of the support bar and the hole(s) that have circular cross-sections.

Figure 3:
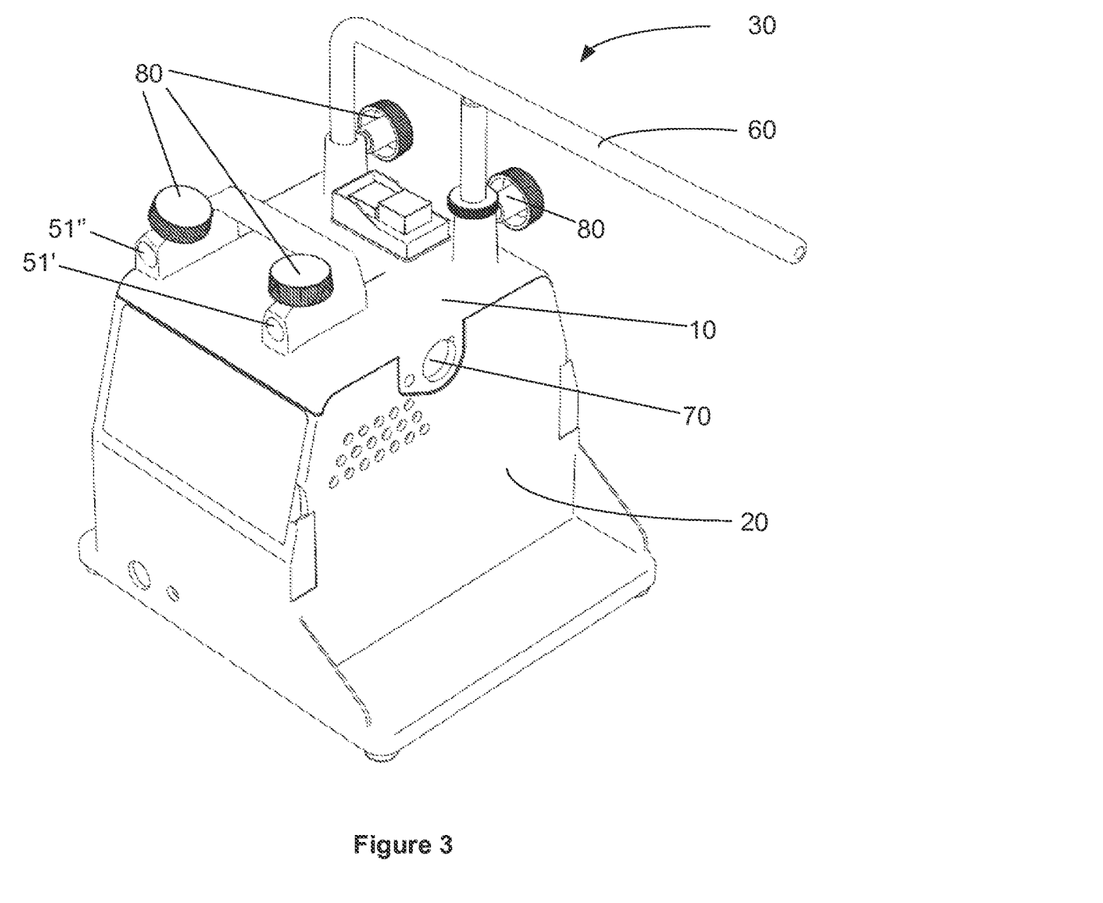
FIG. 3 is a perspective view of the first casing part of FIG. 2, when the first casing part is releasably mounted to a second casing part for forming a grinding machine casing of a grinding machine.
Figure 4:
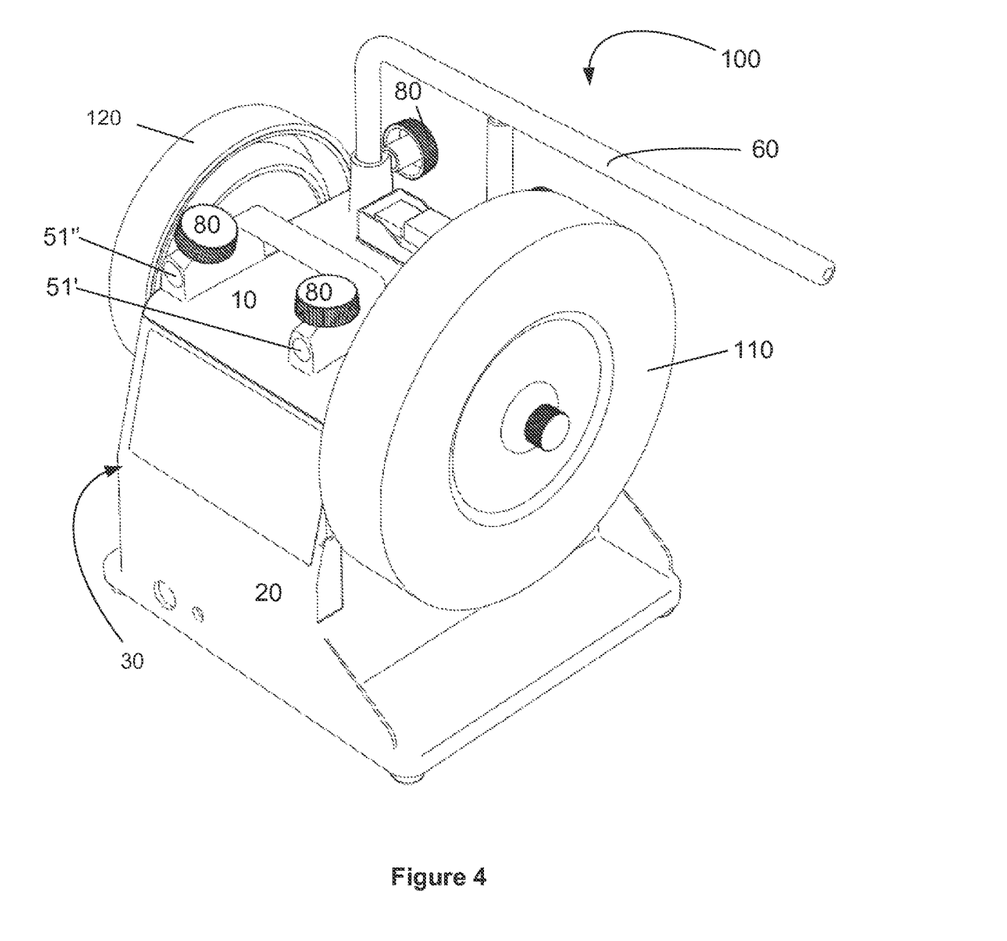
FIG. 4 is a perspective view of a grinding machine including the grinding machine casing in FIG. 3.
Figure 5:
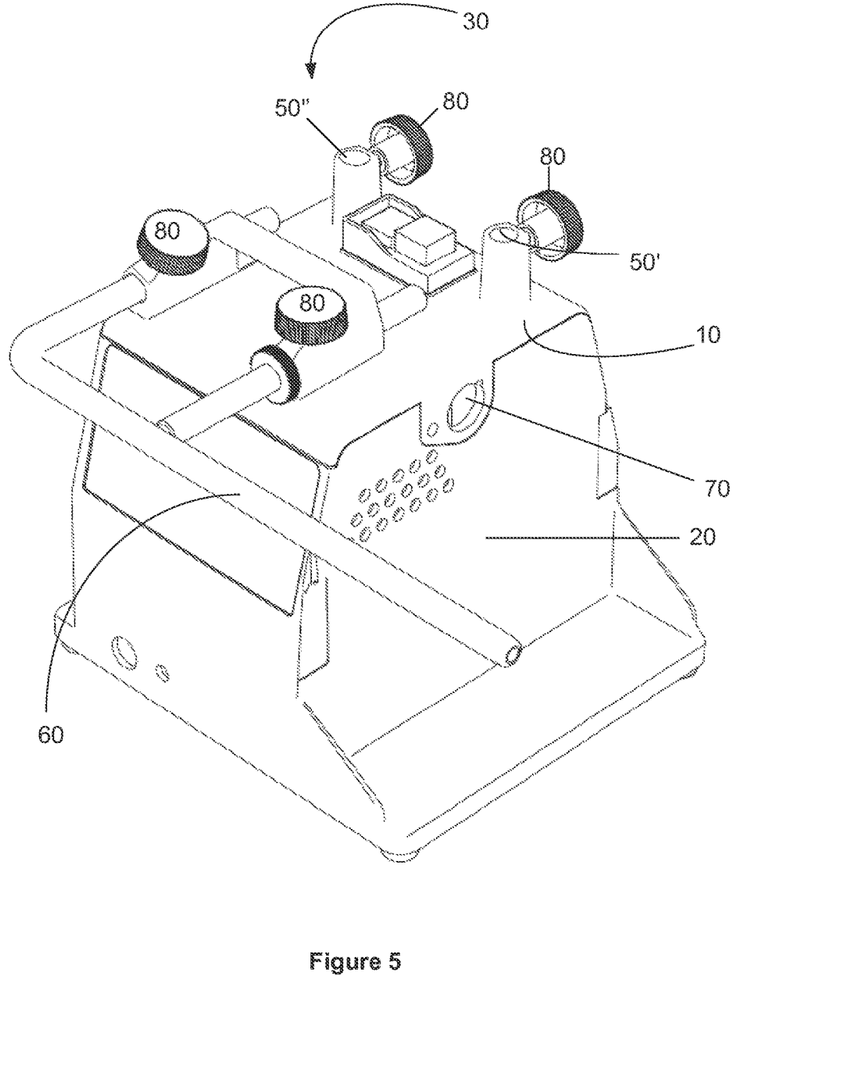
FIG. 5 is another perspective view of the first casing part of FIG. 2, when the first casing part is releasably mounted to a second casing part for forming a grinding machine casing of a grinding machine.
Figure 6:
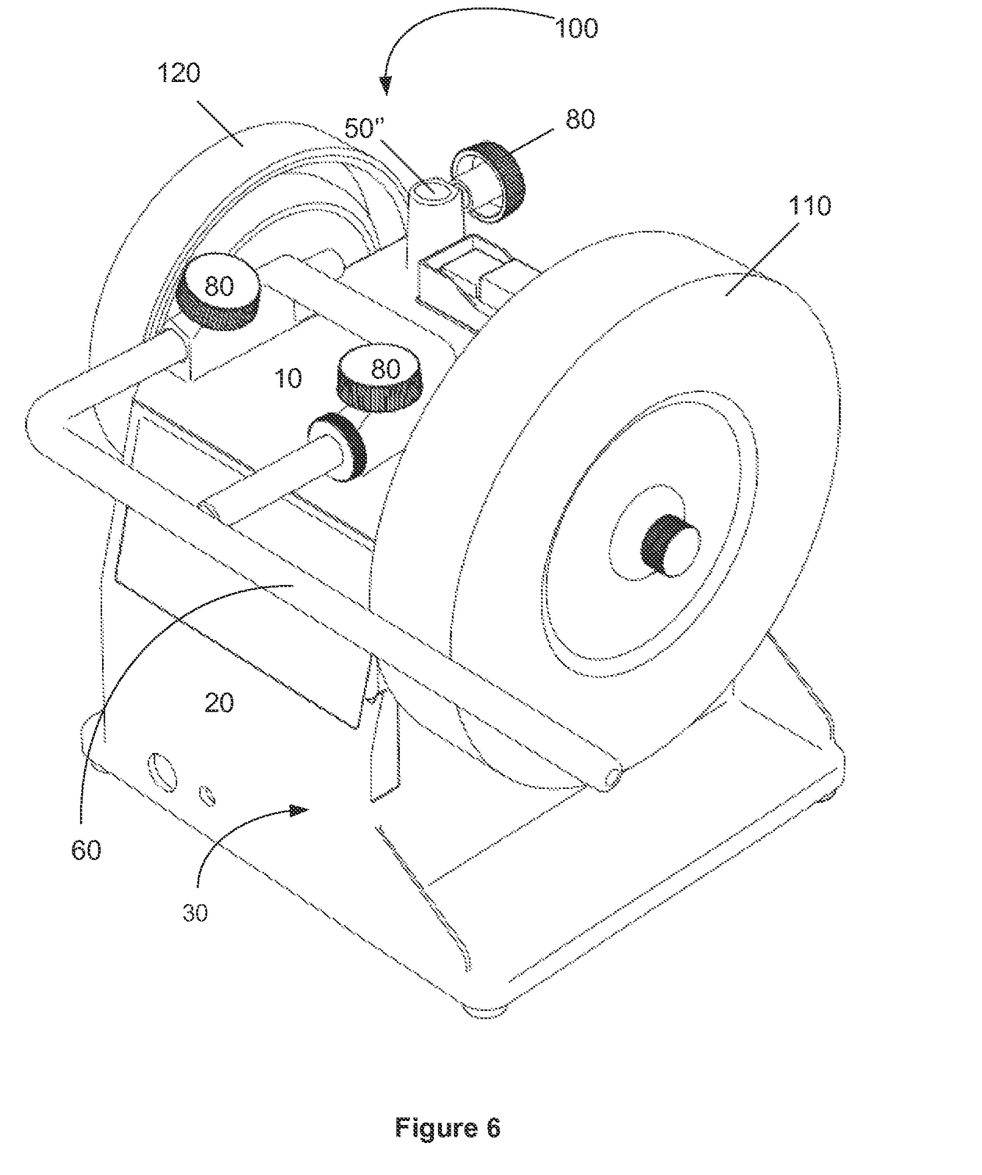
FIG. 6 is a perspective view of a grinding machine including the grinding machine casing in FIG. 5.
Figure 7:
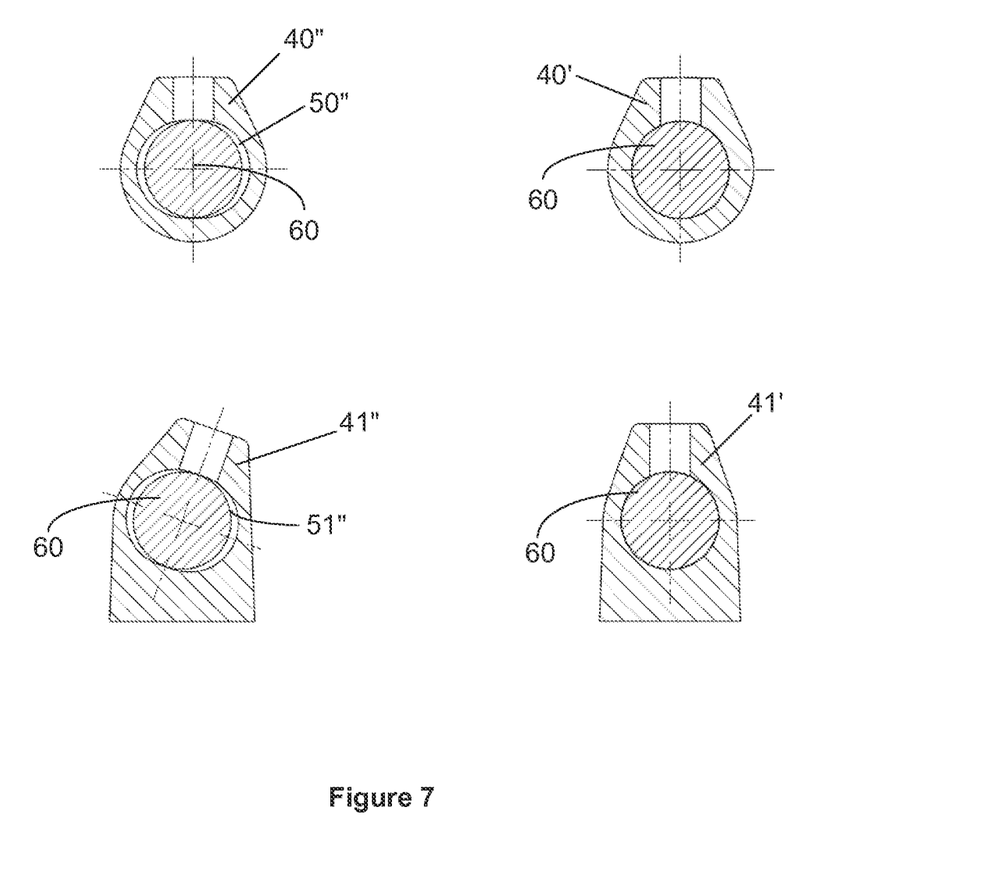
FIG. 7 is a cross-section view of various brackets shown in FIGS. 3-6.

The first casing part 10, which is best shown in FIGS. 2-6, may preferably be moulded. For example, the first casing part 10 may be made of moulded metal, such as Zinc. Alternatively, the first casing part 10 may e.g. be made of aluminum. As is shown in FIGS. 3 and 5, respectively, the first casing part 10 further comprises a hole adapted to receive a pivotal axis of a rotatable grindstone 110 (see also FIGS. 4 and 6). The first casing part may optionally also comprise a hole (not shown) adapted to receive a pivotal axis of a wheel 120 for honing. Still further, a motor for driving the grinding machine 100 (see FIGS. 4 and 6) may be releasably mounted to (or, alternatively fixed to) the first casing part 10. In other words, it is possible to mount the motor and/or the grindstone 110 and/or the wheel 120 for honing to the moulded first casing part 10. In operation of the grinding machine 100 (see FIGS. 4 and 6), the motor and/or the grindstone 110 and/or the wheel 120 for honing may thus be mounted to the moulded first casing part. Since the motor and/or the grindstone 110 and/or the wheel for honing 120 may be mounted to the moulded first casing part 10, the moulded first casing part 10 may absorb vibrations caused by the operation of the motor and/or the rotation of the grindstone 110 and/or the rotation of the wheel 120 for honing. In turn, the absorbing of these vibrations may contribute to an increased stability of the grinding machine 100 during the operation of the grinding machine. Improved stability of the grinding machine may, in turn, improve the likelihood that the user achieves a desired precision when sharpening edge tools on the grindstone of the grinding machine. As would be understood by persons skilled in the art, all or most of the those parts contributing to the central functions of a grinding machine 100 may be mounted to the moulded first casing part 10, which moulded first casing part 10 may thus contribute to improved stability during the operation of the grinding machine.

FIGS. 4 and 6, respectively, illustrate an exemplary grinding machine 100, which is ready for operation. The grinding machine 100 comprises a grinding machine casing 30. The grinding machine casing 30 comprises a first casing part 10 mounted to a second casing part 20. The first casing part 10 is a first casing part 10 according to any one of the embodiments described hereinabove. The second casing part 20 may be moulded. For example, the second casing part may be made of moulded metal, e.g. Zinc. Alternatively, the second casing part may e.g. be made of plastic. It should be understood that the grinding machine casing 30 may alternatively be provided in one single part. In other words, it is not necessary that two casing parts 10, 20 are mounted to each other to form the grinding machine casing 30 of the grinding machine 100. If provided in one single part, the grinding machine casing 30 may preferably, but not necessarily, be moulded. For instance, it may be made of moulded metal, such as Zinc. As can be seen in FIGS. 4 and 6, respectively, the grinding machine 100 is also provided with a grindstone 110 driven for rotation by a motor, e.g. an electrical motor (not shown), in the grinding machine 100. Optionally, the grinding machine 100 is also provided with a wheel 120 for honing.

Figure 8:
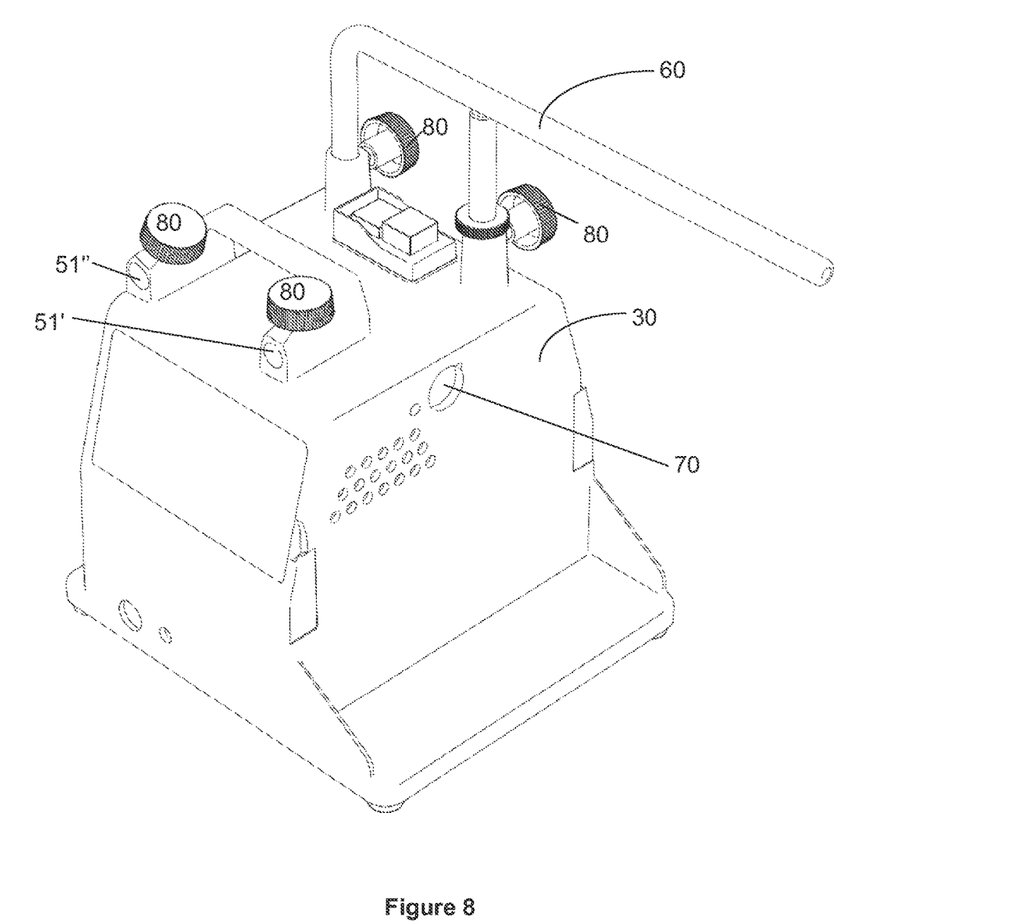
FIG. 8 is a perspective view of a grinding machine casing for a grinding machine, in accordance with an embodiment.

Persons skilled in the art having benefit of this disclosure will understand that the effects and advantages achieved by the provision of at least one bracket in each set of brackets having a hole the cross-section of which is non-circular may be achieved also for grinding machines, which are not necessarily provided with a first casing part. As a mere example, FIG. 8 illustrates one example embodiment of a grinding machine casing 30, or grinding machine body, for a grinding machine. This embodiment is similar to the earlier-described embodiments. However, in contrast to the embodiments described hitherto, the embodiment in FIG. 8 does not involve two casing parts that are mountable to each other to form a grinding machine casing. Instead, the grinding machine casing 30 schematically illustrated in FIG. 8 is provided in a single part, or piece. Preferably, the grinding machine casing 30 is made of metal, e.g. Zinc. The grinding machine casing 30 is typically moulded, or casted, in one piece. As is appreciated, the grinding machine casing 30, or grinding machine body, comprises at least one set of brackets, wherein each bracket of the at least one set of brackets comprises a hole which is adapted to receive a cylindrical end of a support bar 60 such that the support bar 60 can be releasably connected to the grinding machine casing 30, and wherein at least one bracket in each set of brackets comprises a hole, the cross-section of which is non-circular (e.g., oval). In some embodiments, only one bracket in each set of brackets comprises a hole, the cross-section of which is non-circular (e.g., oval). Preferably, but not necessarily, the grinding machine casing 30 comprises two sets of brackets wherein one bracket in each set of brackets comprises the hole 51", the cross-section of which is non-circular (e.g., oval). As can be seen in FIG. 8, the grinding machine casing 30 may further comprise a hole 70 adapted to receive a pivotal axis of a rotatable grindstone. Also, a motor for driving the grinding machine may ne provided. The motor (not shown) may be releasably attached to, or alternatively fixed to, the grinding machine casing 30.

Selected Example Embodiments Described Herein

The technology described in this disclosure thus encompasses without limitation the following Numbered Example Embodiments (NEE's):

NEE1. A first casing part 10 mountable to a second casing part 20 for forming a grinding machine casing 30 of a grinding machine, wherein the first casing part 10 comprises at least one set of brackets 40; 41, wherein each bracket 40', 40"; 41', 41" of the at least one set of brackets 40; 41 comprises a hole 50'; 50"; 51', 51" which is adapted to receive a cylindrical end of a support bar 60 such that the support bar 60 can be releasably connected to the first casing part 10, and wherein at least one bracket 40";41" in each set of brackets 40; 41 comprises a hole 50"; 51", a cross-section of which is non-circular.

NEE2. The first casing part 10 according to NEE1, wherein only one bracket 40"; 41" in each set of brackets 40; 41 comprises a hole 50"; 51", the cross-section of which is non-circular.

NEE3. The first casing part 10 according to NEE2, wherein the first casing part 10 comprises two sets of brackets 40; 41 and wherein one bracket 40"; 41" in each set of brackets 40; 41 comprises the hole 50"; 51", the cross-section of which is non-circular.

NEE4. The first casing part 10 according to NEE1, NEE2 or NEE3, wherein a cross-section which is non-circular is oval.

NEE5. The first casing part 10 according to any one of the preceding NEEs, wherein the first casing part 10 is moulded.

NEE6. The first casing part 10 according to NEE5, wherein the first casing part 10 is made of moulded metal.

NEE7. The first casing part 10 according to NEE6, wherein the metal is Zinc.

NEE8. The first casing part 10 according to any one of the NEEs 5-7, wherein the first casing part 10 further comprises a hole 70 adapted to receive a pivotal axis of a rotatable grindstone.

NEE9. The first casing part 10 according to any one of the NEEs 5-8, wherein a motor for driving the grinding machine is releasably mounted to the first casing part 10.

NEE10. A grinding machine casing 30 for a grinding machine, the grinding machine casing 30 comprising a first casing part 10 mounted to a second casing part 20, wherein the first casing part 10 is a first casing part 10 according to any one of the NEEs 1-9.

NEE11. A grinding machine 10 comprising the grinding machine casing according to NEE10.

NEE12. A grinding machine casing 30 for a grinding machine 100, wherein the grinding machine casing 30 comprises at least one set of brackets 40; 41, wherein each bracket 40', 40"; 41', 41" of the at least one set of brackets 40; 41 comprises a hole 50'; 50"; 51', 51" which is adapted to receive a cylindrical end of a support bar 60 such that the support bar 60 can be releasably connected to the grinding machine casing 30, and wherein at least one bracket 40";41" in each set of brackets 40; 41 comprises a hole 50"; 51", a cross-section of which is non-circular.

NEE13. The grinding machine casing 30 according to NEE12, wherein only one bracket 40";41" in each set of brackets 40; 41 comprises a hole 50"; 51", the cross-section of which is non-circular.

NEE14. The grinding machine casing 30 according to NEE13, wherein the grinding machine casing 30 comprises two sets of brackets 40; 41 and wherein one bracket 40"; 41" in each set of brackets 40; 41 comprises the hole 50"; 51", the cross-section of which is non-circular.

NEE15. The grinding machine casing 30 according to NEE12, NEE13 or NEE14, wherein a cross-section which is non-circular is oval.

NEE16. The grinding machine casing 30 according to any one of the NEEs 12-15, wherein the grinding machine casing 30 is moulded in one piece.

NEE17. The grinding machine casing 30 according to NEE16, wherein the grinding machine casing 30 is made of metal.

NEE18. The grinding machine casing 30 according to NEE17, wherein the metal is Zinc.

NEE19. The grinding machine casing 30 according to any one of the NEEs 12-18, wherein the grinding machine casing 30 further comprises a hole 70 adapted to receive a pivotal axis of a rotatable grindstone.

NEE20. The grinding machine casing 30 according to any one of the NEEs 12-19, wherein a motor for driving the grinding machine is releasably mounted to the grinding machine casing 30.

NEE21. A grinding machine (100) comprising the grinding machine casing 30 according to any one of the NEEs 12-20.

Modifications and other variants of the described embodiments will come to mind to one skilled in the art having benefit of the teachings presented in the foregoing description and associated drawings. Therefore, it is to be understood that the embodiments are not limited to the specific example embodiments disclosed and that modifications and other variants are intended to be included within the scope of this disclosure. Therefore, a person skilled in the art would recognize numerous variations to the described embodiments that would still fall within the scope of the appended claims. For example, one bracket in each set of brackets has been described in the detailed description to comprise a hole, the cross-section of which is non-circular, such as oval. Accordingly, the non-circular cross-section may for instance have the shape of an ellipse, a stadium, or any other egg-like shape. However, persons skilled in the art having benefit of this disclosure will understand that other non-circular shapes of the cross-section are also conceivable. For instance, the non-circular cross-section could be in the shape of a polygon such as a triangle or a rectangle (e.g. a square). Yet further, throughout the detailed description of the preferred embodiments the first casing part has been exemplified to be a moulded first casing part. Persons skilled in the art having benefit of this disclosure will however understand that the effects and advantages achieved by the provision of at least one bracket in each set of brackets having a hole the cross-section of which is non-circular may be achieved also for grinding machines, which are not necessarily provided with a first casing part. For example, a conventional grinding machine such as the grinding machine 1 shown in FIG. 1 could benefit from the provision of at least one set of brackets according to the appended claim 1. Thus, even if a first casing part (e.g. moulded) is preferred, this will be understood as an optional, particular advantageous, feature of some embodiments of the invention. Moreover, although specific terms may be employed herein, they are used in a generic and descriptive sense only and not for purposes of limitation. Furthermore, as used herein, the terms "comprise/comprises" or "include/includes" do not exclude the presence of other elements. Still further, although individual features may be included in different claims, these may possibly advantageously be combined, and the inclusion of different claims does not imply that a combination of features is not feasible and/or advantageous. Finally, reference signs in the claims are provided merely as a clarifying example and should not be construed as limiting the scope of the claims in any way.

What is claimed is:

1. A grinding machine for sharpening an edge tool, the grinding machine comprising:
   (a) a circular grindstone driven by a motor, and the circular grindstone having a rotation axis;
   (b) a support bar for supporting an edge tool and arranged parallel to the rotation axis and comprising a support bar first cylindrical leg and a support bar second cylindrical leg, wherein the support bar first cylindrical leg and the support bar second cylindrical leg are parallel to each other and extend outwardly from the support bar; and
   (c) a grinding machine casing comprising a first bracket and a second bracket, the first bracket comprising a first hole constructed to receive the support bar first cylindrical leg, and the second bracket comprising a second hole constructed to receive the support bar second cylindrical leg, wherein the support bar is arranged parallel to the rotation axis when the support bar first cylindrical leg is received in the first hole and the support bar second cylindrical leg is received in the second hole, wherein the first hole comprises a circular cross-section, and the second hole comprises a non-circular cross-section, wherein the support bar first cylindrical leg is slideable within the first hole and the support bar second cylindrical leg is slideable within the second hole so that the support bar can move closer to or further away from the circular grindstone, wherein the support bar first cylindrical leg is configured to be secured in the first hole by a first set screw and the support bar second cylindrical leg is configured to be secured in the second hole by a second set screw, and wherein, when the support bar first cylindrical leg is secured in the first hole by the first set screw and the support bar second cylindrical leg is secured in the second hole by the second set screw, the non-circular cross-section of the second hole includes gaps between an inside surface of the second hole and the support bar second cylindrical leg that are transverse to a direction the second set screw extends for tightening the support bar second cylindrical leg within the second hole.

2. The grinding machine according to claim 1, wherein the grinding machine casing comprises a third bracket and a fourth bracket, the third bracket comprising a third hole constructed to receive the support bar first cylindrical leg, and the fourth bracket comprising fourth hole constructed to receive the support bar second cylindrical leg, wherein the third hole comprises a circular cross-section, and the fourth hole comprises a non-circular cross-section, wherein the support bar first cylindrical leg is slideable within the third hole and the support bar second cylindrical leg is slideable within the fourth hole so that the support bar can move closer to or further away from the circular grindstone, wherein the support bar first cylindrical leg is configured to be secured in the third hole by a third set screw and the support bar second cylindrical leg is configured to be secured in the fourth hole by a fourth set screw, and wherein, when the support bar first cylindrical leg is secured in the third hole by the third set screw and the support bar second cylindrical leg is secured in the fourth hole by the fourth set screw, the non-circular cross-section of the fourth hole includes gaps between an inside surface of the fourth hole and the support bar second cylindrical leg that are transverse to a direction the fourth set screw extends for tightening the support bar second cylindrical leg within the fourth hole.

3. The grinding machine according to claim 1, wherein said non-circular cross-section of the second hole is oval.

4. The grinding machine according to claim 1, wherein the grinding machine casing is molded.

5. The grinding machine according to claim 1, wherein the grinding machine casing is made of metal.

6. The grinding machine according to claim 5, wherein the metal comprises zinc.

7. The grinding machine according to claim 1, further comprising a motor for driving the circular grindstone.

8. The grinding machine according to claim 2, wherein the non-circular cross-section of the fourth hole is oval.

9. The grinding machine according to claim 1, further comprising a motor adapted to drive the circular grindstone in rotation about the rotation axis.

* * * * *